United States Patent
Ahn et al.

(10) Patent No.: US 9,867,183 B2
(45) Date of Patent: Jan. 9, 2018

(54) COMMUNICATION METHOD AND WIRELESS DEVICE FOR SUPPORTING VARIABLE BANDWIDTH

(71) Applicant: LG ELECTRONICS INC., Seoul (KR)

(72) Inventors: Joonkui Ahn, Seoul (KR); Yunjung Yi, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/898,683

(22) PCT Filed: Jul. 11, 2014

(86) PCT No.: PCT/KR2014/006258
§ 371 (c)(1),
(2) Date: Dec. 15, 2015

(87) PCT Pub. No.: WO2015/005724
PCT Pub. Date: Jan. 15, 2015

(65) Prior Publication Data
US 2016/0135177 A1    May 12, 2016

Related U.S. Application Data

(60) Provisional application No. 61/845,378, filed on Jul. 12, 2013, provisional application No. 61/897,226, (Continued)

(51) Int. Cl.
*H04W 72/04* (2009.01)
*H04W 74/08* (2009.01)
(Continued)

(52) U.S. Cl.
CPC .......... *H04W 72/0446* (2013.01); *H04L 5/00* (2013.01); *H04W 48/12* (2013.01);
(Continued)

(58) Field of Classification Search
CPC .......... H04W 72/0446; H04W 72/042; H04W 74/0833
See application file for complete search history.

(56) References Cited

U.S. PATENT DOCUMENTS 8,767,585 B2 *  7/2014  Pelletier .............. H04W 74/002
                                                    370/203
2014/0307697 A1 * 10/2014  Beale .................... H04L 5/0044
                                                    370/329

(Continued)

FOREIGN PATENT DOCUMENTS

| KR | 10-0943619 B1 | 2/2010 |
| WO | 2013/012213 A2 | 1/2013 |
| WO | 2013/027969 A2 | 2/2013 |

OTHER PUBLICATIONS

Ericsson et al.,"Standards aspects impacting MTC LTE UE costs", R1-113683, 3GPP TSG-RAN WG1 Meeting #67, San Francisco, Nov. 14-18, 2011.
(Continued)

*Primary Examiner* — Saba Tsegaye
(74) *Attorney, Agent, or Firm* — Dentons US LLP

(57) ABSTRACT

Provided are a method and an apparatus for supporting a variable bandwidth in a wireless communication system. A wireless device receives first system information in a base band and receives second system information in a limited band. The first system information comprises information indicating the limited band.

10 Claims, 6 Drawing Sheets

Related U.S. Application Data filed on Oct. 30, 2013, provisional application No. 61/945,111, filed on Feb. 26, 2014.

(51) Int. Cl.
    *H04W 48/12*     (2009.01)
    *H04L 5/00*     (2006.01)
    *H04W 74/00*     (2009.01)

(52) U.S. Cl.
    CPC ....... *H04W 72/042* (2013.01); *H04W 74/006* (2013.01); *H04W 74/0833* (2013.01)

(56) References Cited

U.S. PATENT DOCUMENTS

| | | | |
|---|---|---|---|
| 2015/0195787 A1* | 7/2015 | Webb | H04W 52/0235 370/311 |
| 2015/0245350 A1* | 8/2015 | Webb | H04L 5/0053 370/329 |

OTHER PUBLICATIONS

Mediatek Inc., "Analysis of Reduction of Maximum Bandwidth for LTE MTC Devices", R1-120631, 3GPP TSG-RAN WG1 #68, Dresden, Germany, Feb. 6-10, 2012.

* cited by examiner

COMMUNICATION METHOD AND WIRELESS DEVICE FOR SUPPORTING VARIABLE BANDWIDTH

This application is a National Stage Application of International Application No. PCT/KR2014/006258, filed on Jul. 11, 2014, which claims the benefit of U.S. Provisional Application No. 61/845,378, filed on Jul. 12, 2013, U.S. Provisional Application No. 61/897,226, filed on Oct. 30, 2013, and U.S. Provisional Application No. 61/945,111, filed on Feb. 26, 2014, all of which are hereby incorporated by reference in their entirety for all purposes as if fully set forth herein.

BACKGROUND OF THE INVENTION

Field of the Invention

The present invention relates to wireless communications, and more particularly, to a communication method supporting a variable bandwidth in a wireless communication system, and a wireless device using the method.

Related Art

Long term evolution (LTE) based on $3^{rd}$ generation partnership project (3GPP) technical specification (TS) release 8 is a promising next-generation mobile communication standard. Recently, LTE-advanced (LTE-A) based on 3GPP TS release 10 supporting multiple carriers is under standardization.

In a next-generation wireless communication system, it is considered to provide a service for a low cost/low specification device which primarily aims at data communication, such as reading a meter, measuring a water level, utilizing a camera, inventory reporting of a vending machine, etc.

For example, machine-type communication (MTC) is one type of data communication including one or more entities not requiring human interactions, and is also called machine to machine (M2M) communication. That is, the MTC refers to the concept of communication based on the legacy wireless communication network used by a mechanical device instead of a user equipment (UE) used by a user. The mechanical device used in the MTC is called an MTC device or an M2M device.

An MTC service requires a low transmission data amount, and not frequently transmits and receives data. Therefore, it is effective to decrease a unit cost of a device and to decrease a battery consumption according to a low data transmission rate. For example, if an operating bandwidth of an MTC device is smaller than that of the legacy mobile terminal, a radio frequency (RF)/baseband complexity of the MTC device can be significantly decreased.

Although the legacy LTE/LTE-A system also supports various bandwidths such as 20 MHz, 10 MHz, 5 MHz, etc., it cannot support wireless devices supporting a plurality of bandwidths. One base station or network system supports only one bandwidth. For example, if the base station supports a 20 MHz bandwidth, only a wireless device supporting the 20 MHz bandwidth can access the base station.

However, wireless devices supporting a narrowband such as the MTC device may be deployed within a coverage of the base station. According to the legacy mobile communication system, a device having a 5 MHz bandwidth cannot access a base station having a 20 MHz bandwidth.

SUMMARY OF THE INVENTION

The present invention provides a method and device for supporting various bandwidths.

In an aspect, a method for supporting a variable bandwidth in a wireless communication system is provided. The method includes receiving, by a wireless device, first system information in a base band, and receiving, by the wireless device, second system information in a restricted band. The first system information comprises information indicating the restricted band.

The base band and the restricted band may have a smaller bandwidth than a system bandwidth.

The first and second system information may be received on a physical downlink shared channel (PDSCH).

A physical downlink control channel (PDCCH) associated with the PDSCH may be monitored in the system bandwidth.

In another aspect, a device for supporting a variable bandwidth in a wireless communication system is provided. The device includes a radio frequency (RF) unit configured to transmit and receive a radio signal, and a processor operatively coupled to the RF unit and configured to receive first system information in a base band, and receive second system information in a restricted band. The first system information comprises information indicating the restricted band.

A base station can provide a service to wireless devices having various bandwidths.

DESCRIPTION OF EXEMPLARY EMBODIMENTS

A wireless device may be fixed or mobile, and may be referred to as another terminology, such as a mobile station (MS), a mobile terminal (MT) a user terminal (UT), a subscriber station (SS), a personal digital assistant (PDA), a wireless modem, a handheld device, etc. Alternatively, the wireless device may be a device supporting a data communication such as a machine-type communication (MTC) device.

A base station (BS) is generally a fixed station that communicates with the wireless device and may be referred to as another terminology, such as an evolved node-B (eNB), a base transceiver system (BTS), an access point, etc.

Hereinafter, the present invention is applied based on a 3rd generation partnership project (3GPP) long term evolution (LTE) according to 3GPP technical specification (TS) release 8 or a 3GPP LTE-Advanced (LTE-A) according to 3GPP TS release 10. This is for exemplary purposes only, and thus the present invention is applicable to various communication systems.

A wireless device may be served by a plurality of serving cells. Each serving cell may be defined by a downlink (DL) component carrier (CC) or a pair of a DL CC and an uplink (UL) CC.

A serving cell may be classified into a primary cell and a secondary cell. The primary cell operates at a primary frequency, performs an initial connection establishment procedure, initiates a connection reestablishment procedure or is designated as a primary cell during a handover. The primary cell may be referred to as a reference cell. The secondary cell operates at a secondary frequency and is configured after establishing a radio resource control (RRC) connection. The secondary cell is used to provide additional radio resources. At least one primary cell is always configured but the secondary cell may be added/modified/released by a upper layer signaling (e.g. RRC message).

A cell index (CI) of the primary cell may be fixed. For example, lowest CI may be set as the CI of the primary cell. Hereinafter, the CI of the primary cell is set to zero and the CI of a secondary cell may be assigned subsequently starting from one.

Figure 1:
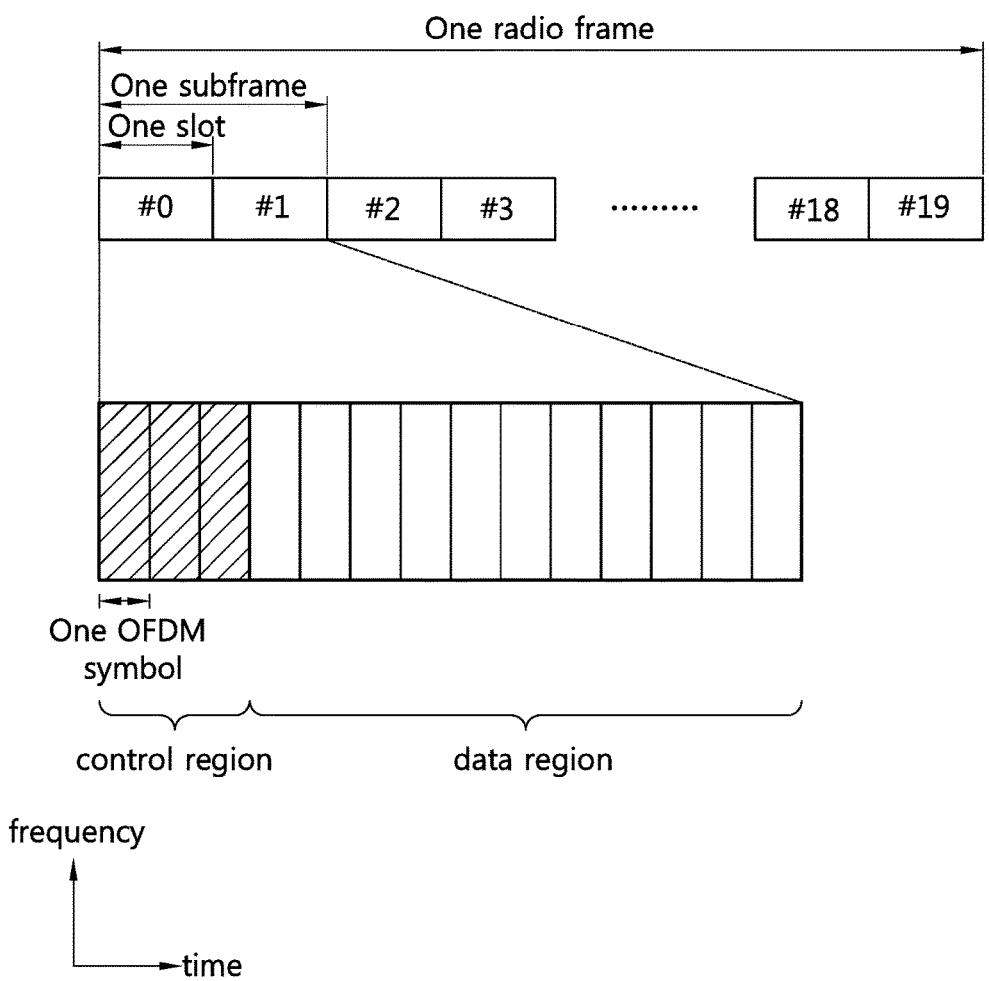
FIG. 1 shows a downlink radio frame structure in $3^{rd}$ generation partnership project (3GPP) long term evolution-advanced (LTE-A).

FIG. 1 shows a downlink radio frame structure in 3GPP LTE-A. The section 6 of 3GPP TS 36.211 V10.2.0 (201-06) "Evolved Universal Terrestrial Radio Access (E-UTRA); Physical Channels and Modulation (Release 10)" may be incorporated herein.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first three OFDM symbols of a 1st slot in the subframe. However, the number of OFDM symbols included in the control region may vary. A physical downlink control channel (PDCCH) and other control channels are allocated to the control region, and a physical downlink shared channel (PDSCH) is allocated to the data region.

DL control channels are described as follows.

As disclosed in 3GPP TS 36.211 V10.2.0, the 3GPP LTE/LTE-A classifies a physical control channel into a physical downlink control channel (PDCCH), a physical control format indicator channel (PCFICH) and a physical hybrid-ARQ indicator channel (PHICH).

The PCFICH transmitted in a 1st OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH is transmitted by using a fixed PCFICH resource of the subframe, without having to perform blind decoding.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a 2nd slot of a 1st subframe of a radio frame. The PBCH carries system information necessary for communication between the UE and the BS. The system information transmitted through the PBCH is referred to as a master information block (MIB). In comparison thereto, system information transmitted on the PDCCH indicated by the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

A BS determines a PDCCH format according to DCI to be transmitted to a wireless device, attaches a CRC to control information, and masks a unique identifier (referred to as a radio network temporary identifier (RNTI)) to the CRC according to an owner or usage of the PDCCH.

The 3GPP LTE-A classifies a UL channels into a physical uplink control channel (PUCCH and a physical uplink shared channel (PUSCH).

Figure 2:
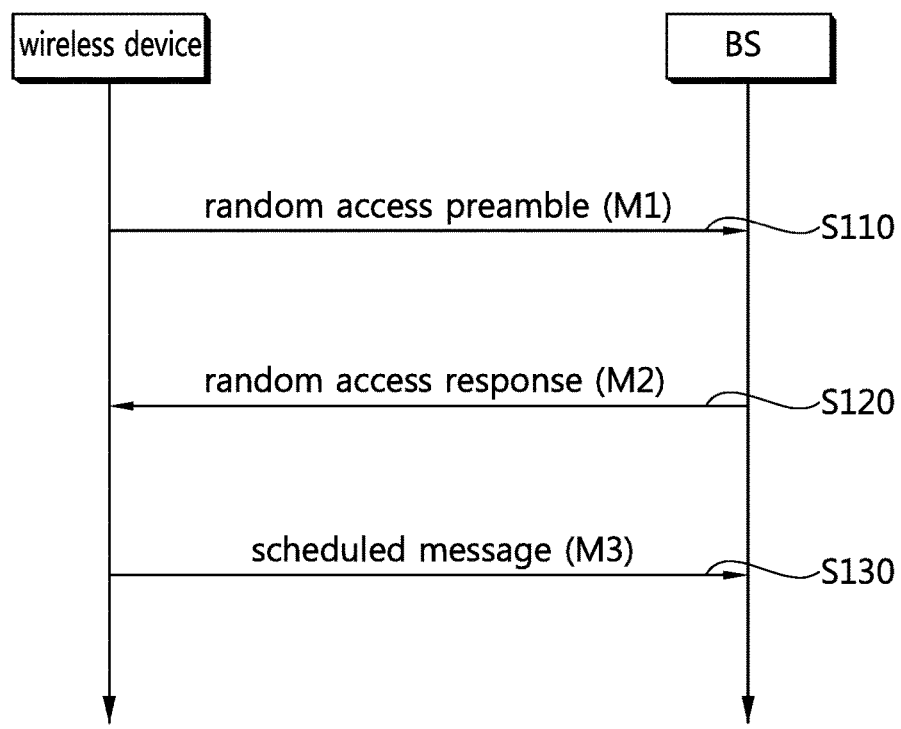
FIG. 2 is a flowchart showing the conventional random access procedure.

FIG. 2 is a flowchart showing the conventional random access procedure. The random access procedure is used by a wireless device to acquire a UL time alignment with a BS or to allocate a UL radio resource.

The wireless device receives a root index and a physical random access channel (PRACH) configuration index from the BS. Each cell has 64 candidate random access preambles defined by a Zadoff-Chu (ZC) sequence. The root index is a logical index for generating the 64 candidate random access preambles by the wireless device.

The random access preamble is limited to a specific time and frequency resource for each cell. The PRACH configuration index indicates a specific subframe and preamble format capable of transmitting the random access preamble.

Table 1 below shows an example of the random access configuration disclosed in the section 5.7 of 36.211 V10.2.0 (2011 June).

TABLE 1

| PRACH configuration index | Preamble format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |

The wireless device transmits a randomly selected random access preamble to the BS (S110). The wireless device selects one of the 64 candidate random access preambles. In addition, the wireless device selects a corresponding subframe by using the PRACH configuration index. The wireless device transmits the selected random access preamble in the selected subframe.

Upon receiving the random access preamble, the BS transmits a random access response (RAR) to the wireless device (S120). The RAR is detected in two steps. First, the wireless device detects a PDCCH masked with a random access-RNTI (RA-RNTI). In addition, the wireless device receives the RAR included in a medium access control (MAC) protocol data unit (PDU) through a PDSCH indicated by the detected PDCCH.

The RAR may include a timing advance command (TAC), a UL grant, and a temporary C-RNTI. The TAC is information indicating a time alignment value sent by a BS to a wireless device to maintain a UL time alignment. The wireless device updates UL transmission timing by using the time alignment value. When the wireless device updates the time alignment, a time alignment timer starts or restarts. The wireless device can perform UL transmission only when the time alignment timer is running.

The wireless device transmits a scheduled message to the BS according to a UL grant included in the RAR (S130).

Hereinafter, the random access preamble, the RAR, and the scheduled message are respectively called messages M1, M2, and M3.

As described above, in a next-generation wireless communication system of LTE-A, it is considered to provide a service for a low cost/low specification device which primarily aims at data communication, such as reading a meter, measuring a water level, utilizing a camera, inventory reporting of a vending machine, etc. For convenience, such a device is called a machine type communication (MTC) device. The MTC device is characterized in that UL/DL data transmission/reception occurs occasionally with a low data transfer rate. The MTC device is designed with an emphasis on having a low cost and a low battery consumption.

For example, if an operating bandwidth of the MTC device is smaller than that of the legacy mobile terminal, a radio frequency (RF)/baseband complexity of the MTC device can be significantly decreased. Alternatively, the number of antennas of the MTC device may be restricted to one or two, or a size of a transport block (TB) that can be received by the MTC device in one subframe may be restricted. A duplexing scheme of an MTC device operating in a frequency division duplex (FDD) system may be restricted to a half-duplexing scheme to decrease complexity of the device.

Hereinafter, it is proposed a transmission method for a wireless device having a restricted transmission/reception capability in comparison with a normal mobile terminal. Such a wireless device is called an MTC device to distinguish from the mobile terminal.

A capability of the MTC device differentiated from the mobile terminal is called an MTC capability/category. The MTC capability may be one of a transmission/reception bandwidth restriction (e.g., up to 1.4 MHz), a receivable TB size restriction (e.g., up to about 1000 bits), a reception antenna number restriction (e.g., one antenna), and a duplexing scheme restriction (e.g., half duplexing), or may include a combination thereof.

When a wireless device attempts an initial access, if a BS does not know whether the device is a normal mobile device or an MTC device, an operation suitable for a capability of the device may be unable to be performed in a data transmission/reception process for the initial access of the device. Therefore, the MTC device is required to report its capability to the BS when performing a handover or the initial access on the BS.

Figure 3:
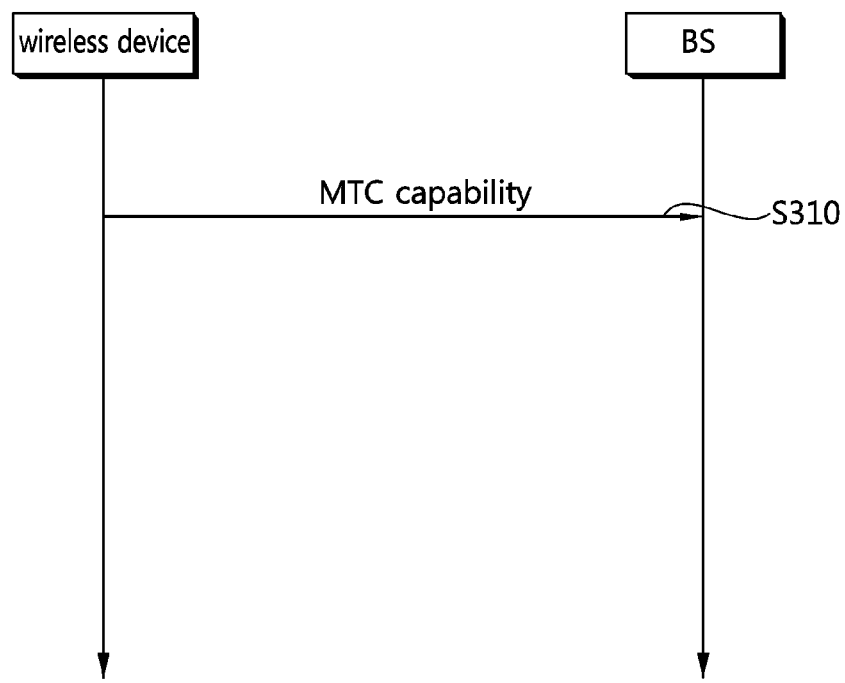
FIG. 3 shows an access method according to an embodiment of the present invention.

FIG. 3 shows an access method according to an embodiment of the present invention.

An MTC device reports an MTC capability to a BS (S310). This process may be performed in a random access process. In the random access process, the MTC capability is reported as follows.

In a first embodiment, a random access preamble may be identified according to the MTC capability. It is assumed that a set of random access preambles used by the MTC device having the MTC capability is denoted by a first group, and a set of random access preambles used by a device not having the MTC capability is denoted by a second group. The MTC device may transmit a random access preamble randomly selected from the set of the random access preambles belonging to the first group.

In a second embodiment, the MTC device may restrict an RACH resource for transmitting the random access preamble. The RACH resource includes a subframe and/or frequency band. When the random access preamble is received on a specific subframe and/or frequency band, a BS may know that a corresponding device has the MTC capability. The RACH resource may be divided into two or more groups according to the MTC capability. In addition, the RACH resource may be changed with a predetermined rule over time.

In a third embodiment, in the aforementioned conventional random access process, the wireless device transmits a message scheduled according to scheduling information included in an RAR. The scheduled message may include information regarding an MTC capability. The MTC capability may be included in the message, or may be transmitted indirectly through CRC scheduling or PUSCH bit/symbol scrambling or the like.

Information regarding an RACH resource or a type of a random access preamble based on the MTC capability may be broadcast by the BS as system information.

The BS may be commercialized by distinguishing RA-RNTI used in scheduling of the RAR according to whether a corresponding device has an MTC capability. First RA-RNTI is used for an MTC device having the MTC capability, and second RA-RNTI is used for an MTC device not having the MTC capability. Therefore, an MTC device which receives the RAR by using the first RA-RNTI may confirm whether the RAR is for a device conforming to the MTC capability.

Now, a reception bandwidth restriction of an MTC device will be described after confirming an MTC capability of the MTC device.

Figure 4:
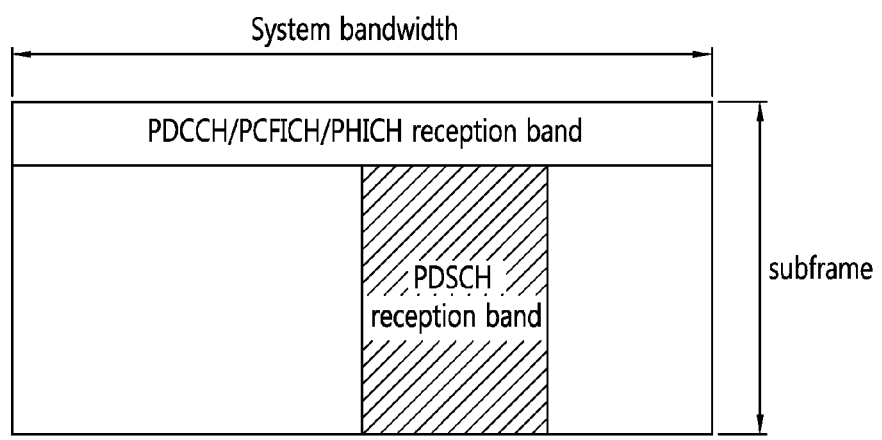
FIG. 4 shows an example of a reception bandwidth restriction.

FIG. 4 shows an example of a reception bandwidth restriction.

It is assumed that complexity of an MTC device is decreased by restricting a reception bandwidth. Since channels such as PDCCH/PHICH/PCFICH or the like are designed to be transmitted through an entire system band in the legacy LTE system, the reception bandwidth cannot be decreased. Therefore, it can be said that a DL channel capable of decreasing the reception bandwidth is restricted.

If a reception bandwidth of a PDSCH is reduced, a PDSCH reception buffer size required in the device can be decreased. Therefore, hereinafter, it is considered that the MTC device has a restriction in the PDSCH reception bandwidth.

When it is reported that an MTC capability can restrict the PDSCH reception bandwidth, a BS may configure a reception band at which a PDSCH must be received within the restricted bandwidth to the MTC device.

However, the MTC device cannot know a band at which PDSCH reception required in an initial access process will be attempted until the PDSCH reception band is configured from the BS. Therefore, it is proposed to receive the PDSCH through a specific band until the PDSCH reception band is configured from the BS to the MTC device. A specific band (this is called a restricted band) at which the MTC device will receive the PDSCH may be defined as follows.

In a first embodiment, the MTC device may receive the PDSCH at a center band of a system until the PDSCH reception band is configured from the BS. For example, when having a bandwidth restriction of 1.4 MHz, center 6 RBs may be used in PDSCH reception.

In a second embodiment, the restricted band may be determined according to a specific condition to increase a degree of freedom of using a frequency. The specific condition may include a system bandwidth of a corresponding cell, a physical cell ID (PCI), a random access preamble index used by the MTC device in an initial access, or a PRACH resource.

In a third embodiment, the BS may broadcast a band at which the MTC device will receive a PDSCH in the initial access through a PBCH, an SIB, or the like. The MTC device may receive the PDSCH at the restricted band until the PDSCH reception band is configured from the BS.

When the restriction band and/or the PDSCH reception band is configured to exceed its capability, the MTC device may ignore a configuration regarding an exceeding part. For example, it is assumed that the MTC device supports up to 6 RBs. If the PDSCH reception band is designated to 10 RBs, the PDSCH reception may be ignored as to the remaining RBs other than the 6 RBs.

Figure 5:
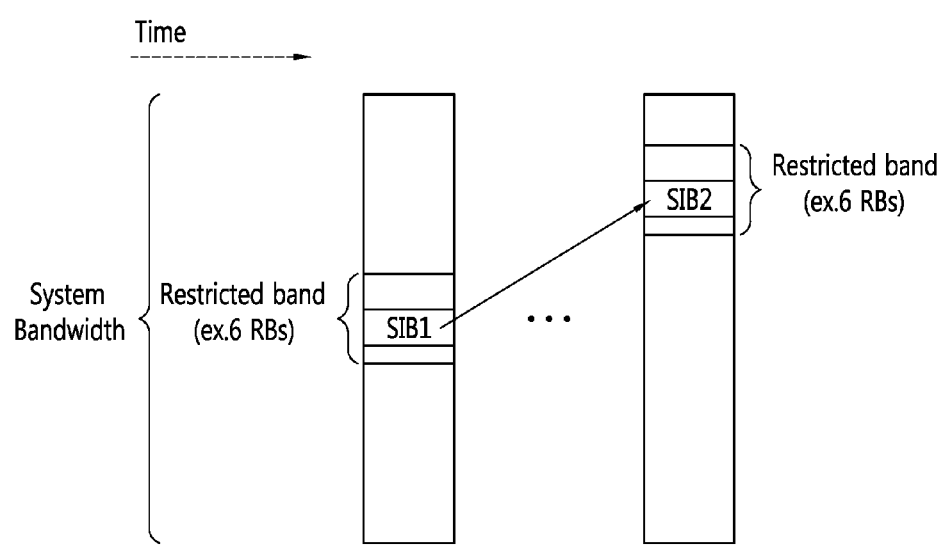
FIG. 5 shows an example of a restricted band configuration for an initial access.

FIG. 5 shows an example of a restricted band configuration for an initial access.

A physical channel (e.g., PDSCH) for transmitting first system information (i.e., SIB1) is transmitted by being scheduled in a predetermined base band (e.g., center 6 RBs). A band at which second system information (i.e., SIB2) can be transmitted may be indicated by the first system information. Advantageously, a band at which system information other than the first system information will be transmitted can be more flexibly configured.

The SIB may include band information that can be used when a random access response (RAR) is transmitted as a response for a random access preamble for an initial access. The MTC device may perform PDSCH reception under the assumption that a corresponding PDSCH corresponding to the RAR is transmitted by being scheduled only in a corresponding band after transmitting the random access preamble. The random access preamble may indicate information regarding the aforementioned MTC capability. Alternatively, a band at which the RAR can be transmitted may be determined by combining information transmitted through the SIB and/or a time/frequency/code resource for transmitting the random access preamble.

The RAR may include band information capable of scheduling the PDSCH at a later time. Upon receiving the RAR, the MTC device may attempt the PDSCH reception under the assumption that next PDSCH transmission is achieved only in a corresponding band.

An RAR transmission band configuration through the SIB may be applied only to a contention-based random access. In a non-contention-based random access, RAR transmission may be achieved through a pre-allocated band through RRC signaling or MAC signaling. The non-contention-based random access implies that the MTC device transmits a predetermined random access preamble. For example, the BS instructs transmission of the random access preamble on a PDCCH, and thus the MTC device transmits the predetermined random access preamble. A contention-based random access implies that the MTC device transmits a randomly selected random access preamble.

In the aforementioned embodiment, the PDCCH/PHICH/PCFICH are transmitted at an entire system band and the PDSCH is transmitted at a restricted band for exemplary purposes only. A first channel may be transmitted at the entire system band, and a second channel may be transmitted at the restricted band. The first channel and the second channel may be a DL channel or a UL channel.

Figure 6:
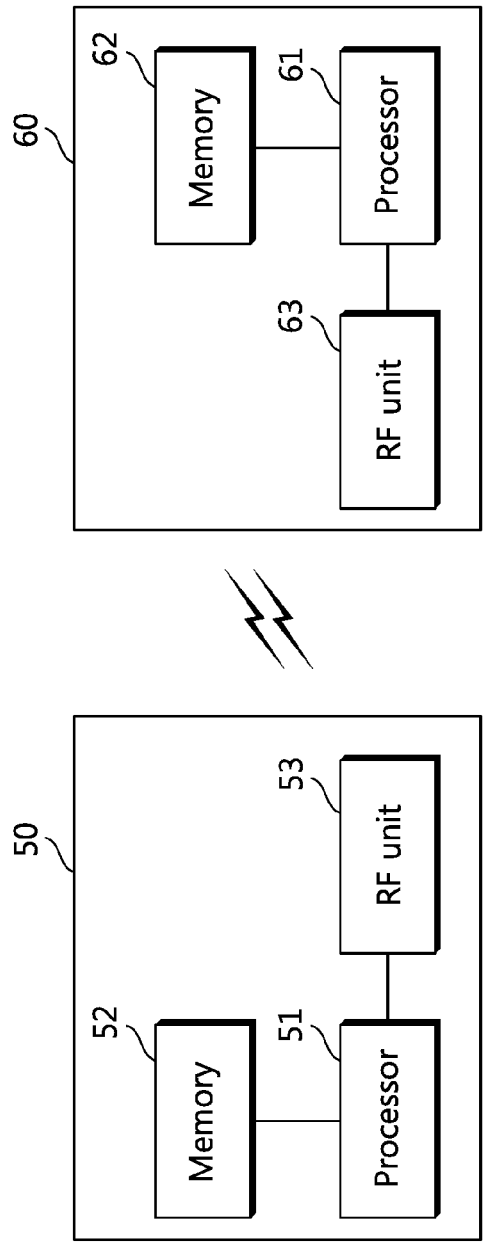
FIG. 6 is a block diagram showing a wireless communication system according to an embodiment of the present invention.

FIG. 6 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiments, an operation of the BS may be implemented by the processor 51.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiments, an operation of the wireless device 60 may be implemented by the processor 61. The wireless device 60 may report an MTC capability to the BS 50, and a PDSCH reception band may be limited.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for supporting variable bandwidth in a wireless communication system, the method comprising:
    receiving, by a wireless device, first system information in a base band; and
    receiving, by the wireless device, second system information in a restricted band,
    wherein the first system information comprises first band information indicating the restricted band for the reception of the second system information,
    wherein the first or second system information includes second band information indicating a specific band for receiving a random access response, and
    wherein the second band information is included within the first or second system information only when a contention-based random access procedure is applied.

2. The method of claim 1, wherein the base band and the restricted band have a smaller bandwidth than a system bandwidth.

3. The method of claim 2, wherein the first and second system information are received on a physical downlink shared channel (PDSCH).

4. The method of claim 3, wherein a physical downlink control channel (PDCCH) associated with the PDSCH is monitored in the system bandwidth.

5. The method of claim 1, wherein the base band and the restricted band have a bandwidth of 1.4 MHz.

6. A device for supporting variable bandwidth in a wireless communication system, the device comprising:
    a receiver; and
    a processor, operatively coupled to the receiver, wherein the processor controls the receiver to:
    receive first system information in a base band; and
    receive second system information in a restricted band,
    wherein the first system information comprises first band information indicating the restricted band for the reception of the second system information,
    wherein the first or second system information includes second band information indicating a specific band for receiving a random access response, and
    wherein the second band information is included within the first or second system information only when a contention-based random access procedure is applied.

7. The device of claim 6, wherein the base band and the restricted band have a smaller bandwidth than a system bandwidth.

8. The device of claim 7, wherein the first and second system information are received on a physical downlink shared channel (PDSCH).

9. The device of claim 8, wherein a physical downlink control channel (PDCCH) associated with the PDSCH is monitored at the system bandwidth.

10. The device of claim 6, wherein the base band and the restricted band have a bandwidth of 1.4 MHz.

* * * * *